(12) United States Patent
Gini

(10) Patent No.: US 6,521,168 B1
(45) Date of Patent: Feb. 18, 2003

(54) METHOD AND EQUIPMENT FOR THE DUAL ORIENTATION OF MULTIPLE-LAYER THERMOPLASTIC MATERIALS

(75) Inventor: Claudio Gini, Oleggio (IT)

(73) Assignee: Tecno Coating Engineering S.r.l., Ticino (IT)

( * ) Notice: Subject to any disclaimer, the term of this patent is extended or adjusted under 35 U.S.C. 154(b) by 185 days.

(21) Appl. No.: 09/690,398

(22) Filed: Oct. 17, 2000

(30) Foreign Application Priority Data

Nov. 16, 1999 (IT) .......................................... MI99A2384

(51) Int. Cl.$^7$ .......................... B29C 55/28; B29C 55/24; B29C 55/26
(52) U.S. Cl. ...................... 264/514; 264/519; 264/564; 264/572; 264/171.28; 264/173.15; 264/173.19; 264/209.5; 264/210.7; 264/288.4
(58) Field of Search ................................. 264/514, 519, 264/564, 572, 171.28, 173.15, 173.19, 209.5, 210.7, 288.4

(56) References Cited

U.S. PATENT DOCUMENTS

| | | | | |
|---|---|---|---|---|
| 3,508,944 A | * | 4/1970 | Henderson et al. | .... 264/171.28 |
| 3,555,604 A | * | 1/1971 | Pahlke | ..................... 425/174.4 |
| 3,904,342 A | * | 9/1975 | Sato et al. | ................ 264/209.5 |
| 3,989,785 A | * | 11/1976 | Bridge | ......................... 264/103 |
| 4,370,293 A | * | 1/1983 | Petersen-Hoj | ................ 264/514 |
| 4,442,147 A | * | 4/1984 | Schimer | ....................... 138/140 |
| 4,476,073 A | * | 10/1984 | Ashcraft | ...................... 156/229 |
| 5,132,074 A | * | 7/1992 | Isozaki et al. | ............ 264/209.5 |
| 5,270,160 A | * | 12/1993 | Hiroaka et al. | ........... 264/176.1 |
| 2002/0014717 A1 | * | 2/2002 | Kling et al. | ............ 264/171.27 |

FOREIGN PATENT DOCUMENTS

JP      57-41924 A   *   3/1982    ............ B29D/7/24

* cited by examiner

*Primary Examiner*—Jan H. Silbaugh
*Assistant Examiner*—Michael I. Poe
(74) *Attorney, Agent, or Firm*—Notaro & Michalos P.C.

(57) ABSTRACT

A process for orienting and drawing multiple-layer thermoplastic materials, in particular of a tubular type, wherein a tube exiting from a heating tunnel is brought up to an orienting temperature of a first material having the highest orienting temperature, while the material of the remaining layers is still in a plastic state. The first material is subjected to a first partial drawing process, while the remaining layers plastically deform to follow its expansion. The temperature of the tube is dropped to the orienting temperature of a second layer and a second layer is drawn, while at the same time continuing to draw the previous layer. Steps of dropping the temperature and drawing the second layer are repeated for the subsequent layers, until the maximum allowable degree of drawing is achieved for each layer.

2 Claims, 3 Drawing Sheets

METHOD AND EQUIPMENT FOR THE DUAL ORIENTATION OF MULTIPLE-LAYER THERMOPLASTIC MATERIALS

FIELD AND BACKGROUND OF THE INVENTION

This invention offers a method and the relative equipment for the drawing and dual orientation of multiple-layer thermoplastic materials, in particular of co-extruded multiple-layer materials, that allows achieving the maximum orientation ratio for all layers, even where these exhibit different drawing ratios and orienting temperatures.

SUMMARY OF THE INVENTION

In particular, the method according to the invention brings a multiple-layer co-extruded tubular exiting the preheating tunnel to the orienting temperature of the material at the highest drawing temperature, performs a first dual orienting phase while the remaining materials are still in a plastic state, drops the temperature of the tubular to the temperature of dual orientation of the second material, performs an orienting phase of the second material while at the same time completing the dual orientation of the first material, and so on for all other layers.

The method according to the invention therefore allows achieving a dual orientation of the various layers at the maxim allowable ratio for each of them, while enhancing their chemical and physical characteristics and also achieving substantial material savings.

The invention refers to the sector of producing multiple-layer extruded materials, and in particular of producing tubulars or films made of a multiple-layer thermoplastic material.

These tubulars or films are used for instance for the packaging of foodstuffs, of a pre-cooked or raw type, thanks to their low cost and chemical-physical characteristics, which ensure the favorable conservation of the product for periods of reasonable length.

These tubulars or films are generally constituted of multiple layers of materials chosen depending on their characteristics.

In particular, the material composing the inner layer must be compatible with the packaged product and be totally non-toxic, and the subsequent layers must provide an effective barrier against gases, liquids, and odors.

These tubulars or films are commonly produced by extruding layers of concentric materials through an annular die, at whose outlet the tubular is calibrated and cooled, then heated by passing it through a tunnel and subsequently dually oriented by simultaneously drawing it in two directions, a transversal and a longitudinal one.

The longitudinal draw is performed by drawing the tubular between two fittings moving at different speeds and at a speed increase between them equal to the drawing ratio, while the transversal draw is performed by the so-called "bubble" system, which consists in blowing a volume of air into the tubular capable of causing an increase of its diameter equal to the drawing ratio, thus generating a sort of air bubble inside the tubular stretch between the two fittings.

These drawing systems are well known to the experts of the trade, so that a detail description is unnecessary.

The different materials composing the various layers generally exhibit different fusion and orientation temperatures, while their maximum obtainable drawing ratios also vary from one material to another.

The following table outlines the mentioned parameters for the materials most commonly used in producing these tubulars:

| Thermoplastic material | Fusion temperature | Orienting temperature | Max. drawing ratio |
|---|---|---|---|
| Polyamides | 220–280° C. | 75–85° C. | 1:3.5 |
| Coplyamides | 190–220° C. | 75–85° C. | 1:3.5 |
| Polypropilenes | 155–165° C. | 138–160° C. | 1:7 |
| PP Copolymers | 140–150° C. | 128–138° C. | 1:6.5 |
| PP Terpolymers | 130–140° C. | 118–118° C. | 1:5.5 |
| Ionomers | 80–100° C. | 55–75° C. | 1:5 |
| Linear Polythenes | 120–130° C. | 102–108° C. | 1:4,5 |
| EVOH | 165–185° C. | 140–160° C. | 1:3 |
| EVA | 90–105° C. | 70–85° C. | 1:5 |

In order to prevent the rupturing of the material composing one or more of these layers, it is obviously necessary that the drawing of the tubular to be oriented observe the values for the material having the lowest drawing ratio.

It follows, therefore, that many of the materials are not fully exploited, as despite being capable of supporting drawing ratios far higher than those applied, they are actually drawn to a lesser extent, at a drawing ratio equal to that of the material tolerating the least degree of elongation.

SUMMARY OF THE INVENTION

These limits are now exceeded by using the method according to the invention, which allows reaching the maximum possible drawing value for each layer. For this purpose the invention provides for taking the tubular exiting the tunnel up to the temperature of the material having the highest drawing temperature and to expand the tubular to start the drawing of this first layer, while the material of the remaining layers, which are still in a molten state, plastically deform by following the elongations of the first layer.

The temperature of the tubular is then reduced and controlled down to the orienting temperature of the second material, continuing to draw the first layer while at the same time drawing this second layer.

The process is thus continued until all layers are fully drawn.

BRIEF DESCRIPTION OF THE DRAWINGS

This invention will now be described in detail, for exemplifying and non-limiting purposes, with reference to the attached figures in which.

DESCRIPTION OF THE PREFERRED EMBODIMENT

The following description refers to the specific case of a tubular or tube comprising three layers, one made of Polyamide, one of adhesive and one of PP Copolymer.

Figure 1:
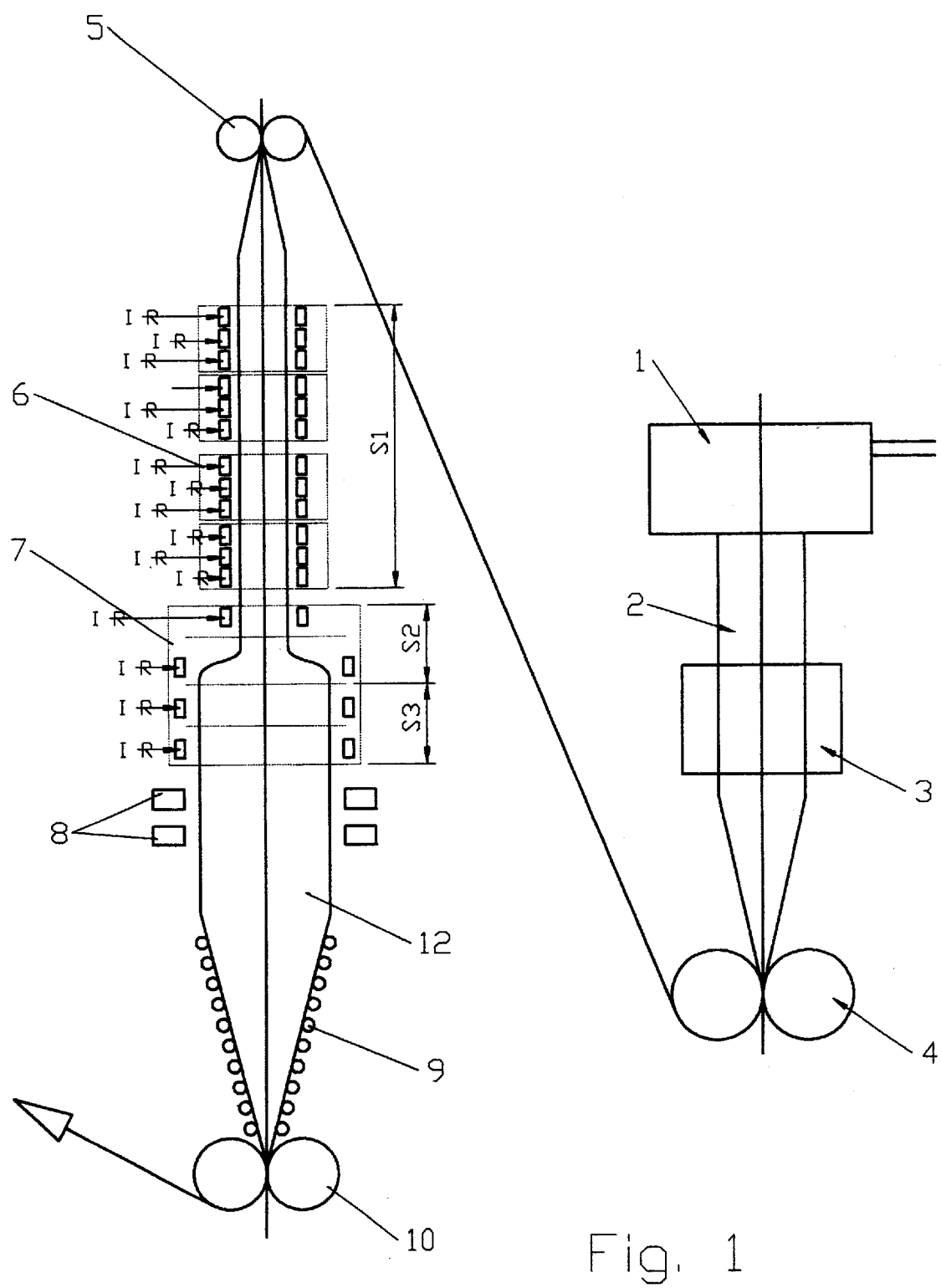
FIG. 1 shows a simplified view of a plant according to the invention for the production of a tubular made of a multiple layer thermoplastic material.
Figure 2:
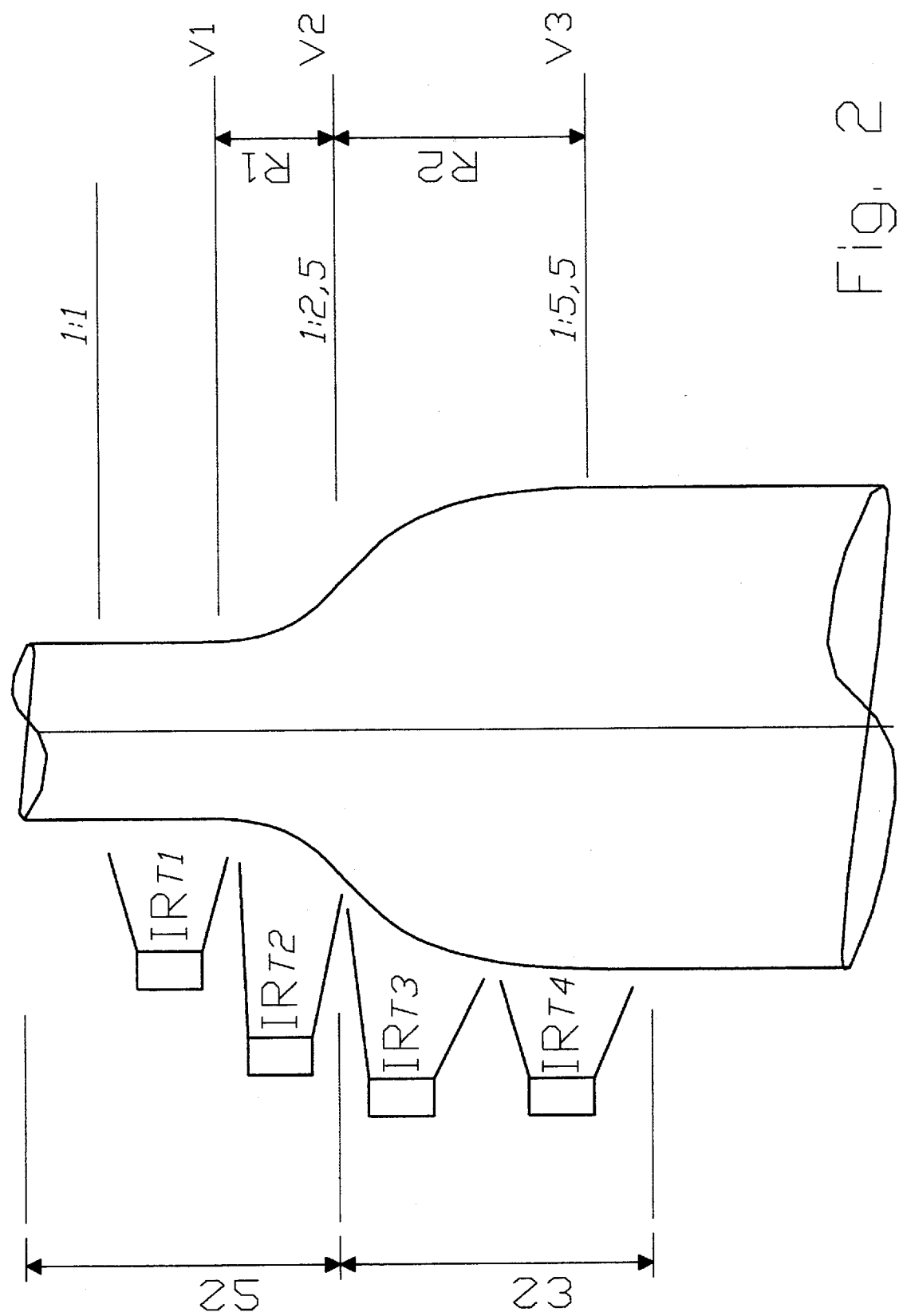
FIG. 2 is en enlarged detail of FIG. 1.

It is clear, however, that the same solution may also be validly applied to materials based on multiple layers, or produced with different materials. In FIG. 1 the number 1 designates a die shown in simplified form, which extrudes a tubular made of a layer of PP Copolymer, one of adhesive and the other of Polyamide.

The PP Copolymer has an orienting temperature in the range of about 128–138° C. and may reach a drawing ratio close to 1:6.5.

The Polyamide has an orienting temperature of 75–85° C. and may reach a drawing ratio of up to 1:3,5 or a maximum of 1:4.

After exiting from the die 1, the tubular 2 passes through a chamber surrounded by a number of annular cooling devices 3, preferably based on water.

These devices are in themselves known, so that a more detailed description is unnecessary.

The rollers 4 entrain the tubular at a speed higher than that of exiting from the die thus causing it to stretch in a plastic phase and to determine the thickness of the primary tubular before the cooling step.

The rollers 5 act in synchronism with the rollers 4 and are placed at the inlet of the tunnel composed of two or more chambers 6 and 7 surrounded by a series of annular heating devices, preferably of the infrared type, designated as IR.

Further downstream a cooling device 8 takes care of cooling the tubular which is then flattened by two planes of rollers 9, picked up between a pair of rollers 10, and finally directed to a winding-up spool not shown in the figure.

The rollers 10 entrain the tubular at a speed higher to that of the rollers 5, thus causing them to elongate and orient themselves in an axial direction.

At the same time, the air blown inside the tubular causes an expansion at the stretch inside the chamber 7 defined by the heating devices IR, and thereby performs its orientation in a transversal sense.

The characteristic of the invention is to provide some means capable of controlling the temperature of the tubular in the various areas of its path, so as to achieve a temperature gradient that varies from the orienting temperature of the Polypropylene in the upstream area at the inlet of the chamber 7, all the way to the (lower) orienting temperature of the Polyamide, in the downstream area toward the outlet of the chamber 7.

In essence, the material in the first stretch of the path inside the chambers 6, in the area indicated by S1 in the figure, is preheated up to the temperature t1 of orienting the Polypropylene, and therefore at about 138° C.

The length of the stretch S1 is such that it is capable of reaching the temperature t1, while taking the tubular's forward speed into due account.

The tubular subsequently moves to the chamber 7, into the area marked S2, and undergoes a first orientation up to a ratio R1 at this point. As the tubular moves on, the temperature is reduced until reaching the value of T2 in the stretch S3, equal to the orienting value of the Polyamide, which is in this specific case about 80° C.

Even in this case the length of the stretch S2 is calculated so that during this stretch the tubular is oriented to the maximum value allowable for the Polyamide, at a drawing ratio R2.

During this phase the orientation of the first layer also continues, an orientation which adds its itself to the previous one, so that even the first layer is oriented to the maximum allowable value, while the intermediate adhesive layer always lengthens in a plastic state.

In essence, if R3 designates the maximum orienting ratio for the first material and R2 is the orienting ratio of the second material, the orienting of the first stretch S2 will be: R1=R3−R2.

In this manner, at the end of the process all the layers will turn out to be oriented at their maximum allowable values.

In conclusion, the method according to the invention provides for performing a first partial drawing action at the orienting temperature of the first material, while the other materials are still in a plastic state and therefore following the deformation of the first material without causing internal stresses, a second phase of reducing the temperature in which the tubular is taken to the lower orienting temperature of a second material, and a further drawing phase in which the drawing of the first stage is completed and the drawing of the second layer is carried out.

The same procedure can be followed in the case of any tubulars of three or more layers, by appropriately changing the various drawing phases.

Figure 3:
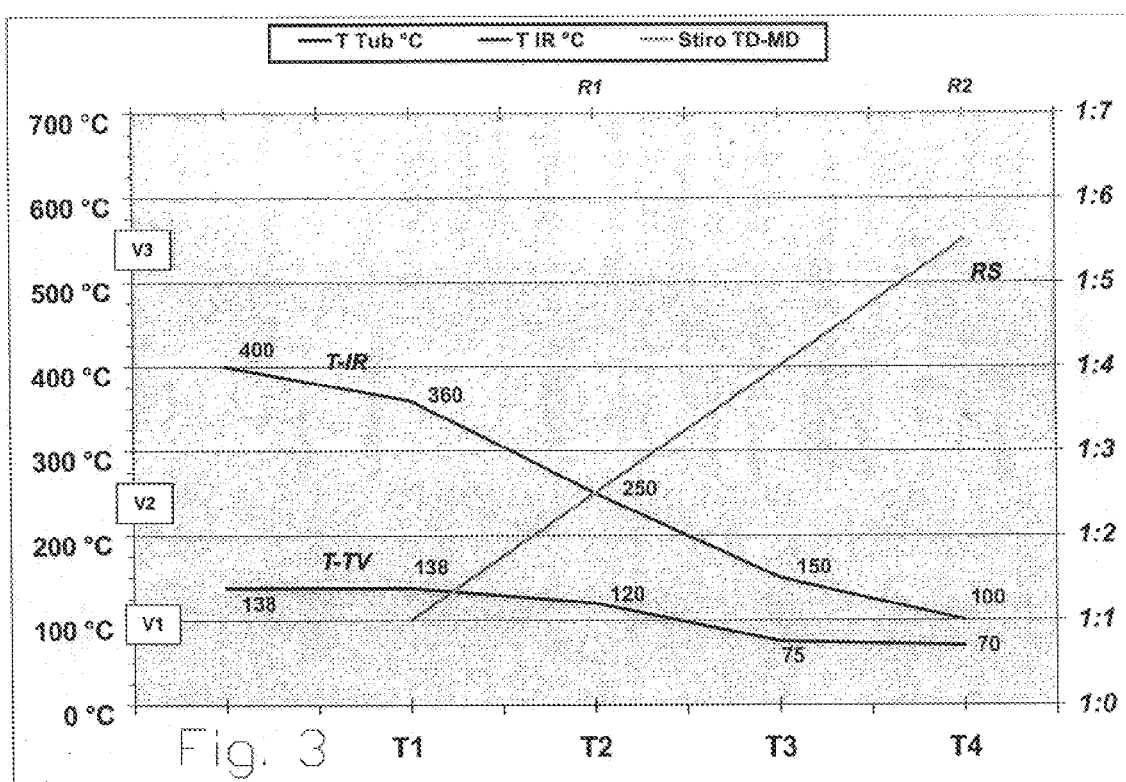
FIG. 3 is a diagram describing the drawing ratio, the heating temperature and the tubular temperature.

The graph of FIG. 3 indicates for exemplifying purposes the various parameters referring to the drawing process of a Polypropylene layer. Here the line "RS" indicates the transversal/longitudinal drawing ratio, the line T-IR the temperature of the heating elements, and the line T-TU the temperature of the tubular itself.

An expert of the trade may provide different modifications and variants, which may however all be deemed to fall within the scope of this invention.

What is claimed is:

1. A process for orienting and drawing a multiple-layer tubular of thermoplastic materials, comprising:

a) bringing a tubular exiting from a preheating tunnel, to an orienting temperature of a first material layer of the tubular having a highest orienting temperature, while material of remaining layers of the tubular are still in a plastic state;

b) performing a first partial drawing of said first material layer while the remaining layers are plastically deforming to follow an expansion of the first material layer;

c) during the partial drawing of said first material layer, a drawing value is reached which equals a difference between a maximum obtainable drawing value of said first material layer and a maximum drawing value of the remaining layers;

d) dropping the temperature of the tubular down to the orienting temperature of a second material layer of the tubular;

e) drawing said second material layer while continuing to draw the first material layer; and f) repeating steps d) and e) for each remaining material layer until a maximum allowable degree of drawing is achieved for each layer.

2. A method according to claim 1, wherein orienting of said tubular occurs by using a "bubble" system.

\* \* \* \* \*